US009169763B2

United States Patent
Atluri et al.

(10) Patent No.: US 9,169,763 B2
(45) Date of Patent: Oct. 27, 2015

(54) SYSTEM AND METHOD FOR SOLAR-POWERED CONTROL OF EXHAUST AFTER-TREATMENT SYSTEMS

(75) Inventors: Venkata Prasad Atluri, Ann Arbor, MI (US); Kushal Narayanaswamy, Sterling Heights, MI (US); Paul M. Najt, Bloomfield Hills, MI (US); Yongsheng He, Sterling Heights, MI (US); Madhusudan Raghavan, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 452 days.

(21) Appl. No.: 13/083,882

(22) Filed: Apr. 11, 2011

(65) Prior Publication Data

US 2012/0255279 A1      Oct. 11, 2012

(51) Int. Cl.
*F01N 9/00*           (2006.01)
*B60K 1/04*           (2006.01)
*B60K 16/00*          (2006.01)
(Continued)

(52) U.S. Cl.
CPC ... *F01N 9/00* (2013.01); *B60K 1/04* (2013.01); *B60K 16/00* (2013.01); *F01N 3/027* (2013.01); *F01N 3/2026* (2013.01); *B60K 13/04* (2013.01); *B60K 2001/0411* (2013.01); *B60K 2001/0444* (2013.01); *B60K 2016/003* (2013.01); *F01N 2900/08* (2013.01); *F01N 2900/12* (2013.01); *Y02T 10/26* (2013.01); *Y02T 10/47* (2013.01)

(58) Field of Classification Search
CPC .... B60K 16/00; B60K 1/04; B60K 2016/003; F01N 3/2026

USPC .................................. 60/284, 286, 300, 303
See application file for complete search history.

(56) References Cited

U.S. PATENT DOCUMENTS

| 5,345,761 A | * | 9/1994 | King et al. ...................... 60/274 |
| 2002/0139114 A1 | * | 10/2002 | Dickau .......................... 60/300 |

(Continued)

FOREIGN PATENT DOCUMENTS

| CN | 101655024 A | 2/2010 |
| DE | 3729126 | 4/1989 |

(Continued)

OTHER PUBLICATIONS

Machine translation of JP 2009-248692A, acessed on Jun. 30, 2014.*

(Continued)

*Primary Examiner* — Audrey K Bradley
*Assistant Examiner* — Jonathan Matthias
(74) *Attorney, Agent, or Firm* — Mark S. Cohen; Pearl Cohen; Zedek Latzer Baratz LLP

(57) ABSTRACT

A system and method for providing energy to auto systems such as systems after-treating exhaust. Energy may be received from a solar energy source electrically connected to an after-treatment system. At least some of the energy from the solar energy source may be provided to the after-treatment system to purify exhaust from an engine. A control module may provide at least some of the energy from the solar energy source to a heater, for example, to initiate heating the after-treatment system prior to starting the engine. The heater may heat the after-treatment to temperatures within a predetermined temperature range associated with optimal efficiency for the after-treatment system.

20 Claims, 10 Drawing Sheets

(51) Int. Cl.
*F01N 3/027* (2006.01)
*F01N 3/20* (2006.01)
*B60K 13/04* (2006.01)

(56) References Cited

U.S. PATENT DOCUMENTS

| | | | |
|---|---|---|---|
| 2008/0223019 A1* | 9/2008 | Gonze et al. | 60/286 |
| 2009/0158715 A1 | 6/2009 | Stroh et al. | |
| 2010/0043404 A1* | 2/2010 | Hebbale et al. | 60/286 |
| 2010/0140246 A1* | 6/2010 | Grider et al. | 219/205 |
| 2010/0212294 A1 | 8/2010 | Narayanaswamy et al. | |
| 2010/0242446 A1* | 9/2010 | Granqvist | 60/286 |

FOREIGN PATENT DOCUMENTS

| | | | |
|---|---|---|---|
| DE | 10 2009 038 110 | | 8/2009 |
| JP | 2009248692 A | * | 10/2009 |
| JP | 2011-047351 | | 3/2011 |
| JP | 2011047351 A | * | 3/2011 |
| KR | 10-0373271 B1 | | 2/2003 |
| WO | WO2010083435 A1 | | 7/2010 |

OTHER PUBLICATIONS

U.S. Appl. No. 12/793,752, filed Jun. 4, 2010, Alturi, V.P. et al.

* cited by examiner

| VEHICLE STATUS 1-DRIVE; 0-PARK | SOLAR POWER 1-SUN; 0-MOON | TEMP | BATTERY VOLTAGE | S1L1 BATT ONLY | S1L2 BATT + FAN | S2 LOAD | S3 LOAD CAT | MODES | PWM X = BLOWER MOTOR Y = BATTERY Z = AFTER-TREATMENT COMP |
|---|---|---|---|---|---|---|---|---|---|
| 1 | 0 | N/A | N/A | 0 | 0 | 0 | 0 | SLEEP 1 | X=0%; Y=0%; Z=0% |
| 0 | 0 | N/A | N/A | 0 | 0 | 0 | 0 | SLEEP 2 | X=0%; Y=0%; Z=0% |
| 0 | 1 | >TREF | >MAX | 0 | 1 | 0 | 0 | BLOWER ON 1 | X=100%; Y=0%; Z=0% |
| 0 | 1 | >TREF | MAX>VBATT>MID | 1 | 1 | 0 | 0 | BLOWER ON 2 | X=80%; Y=20%; Z=0% |
| 0 | 1 | >TREF | MID>VBATT>MIN | 1 | 1 | 0 | 0 | BLOWER ON 3 | X=40%; Y=60%; Z=0% |
| 0 | 1 | <TREF | MAX>VBATT>MID | 1 | 0 | 0 | 0 | TRICKLE CHARGE | X=0%; Y=60%; Z=0% |
| 0 | 1 | <TREF | MID>VBATT>MIN | 0 | 0 | 0 | 0 | BULK CHARGE | X=0%; Y=100%; Z=0% |
| 0 | 1 | <TREF | >MAX | 0 | 1 | 0 | 1 | AFTER-TREATMENT | X=0%; Y=0%; Z=100% (PARKED) |
| 1 | 1 | <TREF | >MAX | 0 | 1 | 0 | 1 | AFTER-TREATMENT | X=0%; Y=0%; Z=100% (DRIVE) |

FIG. 3

SYSTEM AND METHOD FOR SOLAR-POWERED CONTROL OF EXHAUST AFTER-TREATMENT SYSTEMS

TECHNICAL FIELD

The present invention is related to exhaust after-treatment systems and methods to clean or purify exhaust from, for example, internal combustion or diesel engines. In particular, the present invention is related to powering after-treatment systems using solar energy.

BACKGROUND

Exhaust gas after-treatment systems and methods aim to reduce exhaust emissions, such as carbon monoxide (CO), unburned hydrocarbons (UHC), NOx and particulate emissions. After-treatment systems may include three-way catalysts (TWC), oxidation catalysts, particulate filters, lean NOx traps, and catalytic converters, such as a selective catalytic reduction catalyst (SCR catalyst) or a urea-selective catalytic reduction catalyst, located downstream of an internal combustion engine.

Nitrogen oxides (NOx) emissions may include nitric oxide (NO) and nitrogen dioxide (NO2). These gases may be harmful to the environment and are restricted according to emission standards, such as, Tier 2, EURO V, Euro VI, low emissions vehicle (LEV) I, LEV II and LEV III. Existing NOx reduction technologies, such as, lean NOx traps and catalytic converters, may reduce NOx emissions to cleaner substances, such as, nitrogen (N2) and water (H2O).

Exhaust gas may have high temperatures, for example, in a range of from approximately 200° C. to approximately 400° C. for a warmed up diesel engine. After-treatment systems may have optimal performance (e.g., a maximum reduction in undesirable emissions) at high temperatures in ranges of from, for example, 250° C. to 350° C. for catalytic converters, 600° C. to about 700° C. for diesel particulate filters (sufficiently hot to burn soot), and 250° C. to about 500° C. for lean NOx traps (sufficiently hot to desulfate or remove sulfur from the trap). These temperature ranges for optimal after-treatment performance may vary depending upon the type of engine and after-treatment process.

These elevated temperatures are typically achieved through the use of an oxidation catalyst or in the case of a diesel engine a diesel oxidation catalyst (DOC), which generates an exothermal reaction with raw hydrocarbons that are included in or injected into the exhaust stream, such as by in-cylinder injection or external injection directly into the exhaust stream.

If the temperatures of the after-treatment systems fall outside these ranges, the after-treatment performance may be compromised and undesirable emissions may increase. For example, each time a car is started, idle, or stops and then starts, the after-treatments system may cool and may be unable to optimally purify the exhaust, thereby contributing to elevated pollutant levels in the air.

SUMMARY OF THE INVENTION

In some embodiments, energy may be received from a solar energy source electrically connected to an after-treatment system. At least some of the energy from the solar energy source may be provided to the after-treatment system to purify exhaust from an engine. A control module may provide at least some of the energy from the solar energy source to a heater, for example, to initiate heating the after-treatment system prior to starting the engine. The heater may heat the after-treatment to temperatures within a predetermined temperature range associated with optimal efficiency for the after-treatment system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a chart defining different modes for allocating energy to different components in a vehicle according to an embodiment of the present invention;

Figure 1:
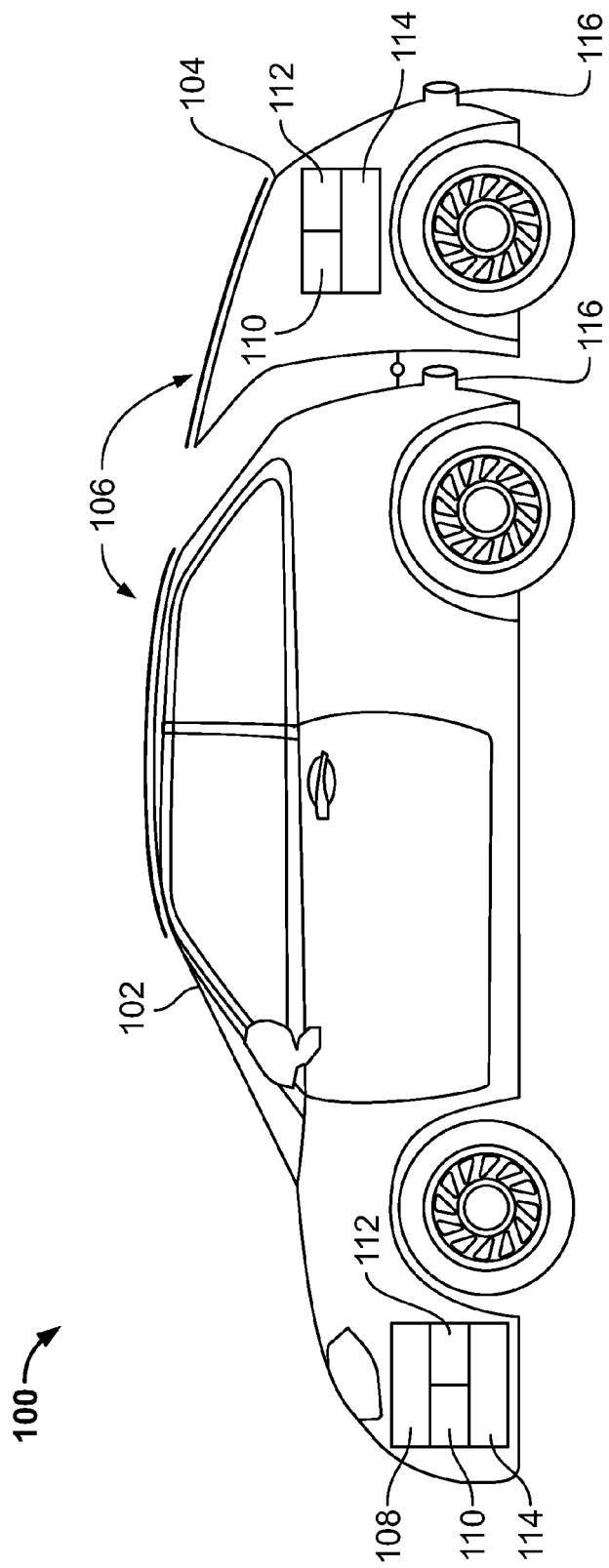
FIG. 1 is a schematic diagram of a vehicle and an after-treatment system according to an embodiment of the present invention.

Reference numerals may be repeated among the drawings to indicate corresponding or analogous elements. Moreover, some of the blocks depicted in the drawings may be combined into a single function.

DETAILED DESCRIPTION OF THE DRAWINGS

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

A vehicle after-treatment system may have optimal efficiency at a specific range of elevated temperatures. However, heating the after-treatment system to these temperatures may take time to achieve. The time it takes to heat the after-treatment system may depend on many factors including the target temperatures for the specific after-treatment system, available energy reserves in the vehicle, ambient temperature or weather conditions, the operational mode of the vehicle, for example, whether the vehicle is parked, stopped, driving, accelerating, etc. In one example, a vehicle may take up to several minutes to properly heat an after-treatment system.

Conventional systems may power or provide energy to after-treatment systems using energy from a vehicle battery. The battery may only begin to provide energy to the after-treatment system once the vehicle's engine is started (and may not provide energy when the engine is off or may provide a reduced amount of energy when idling). Accordingly, there may be a time delay after a vehicle has just been started and/or each time the vehicle idles when the after-treatment system has not yet reached optimal temperatures. The after-treatment system may operate with sub-optimal efficiency during these time delays, for example, emitting undesirable amounts of contaminated exhaust.

According to embodiments of the invention, an after-treatment system may use solar power to power (e.g. heat) after-treatment systems. Solar power energy or electricity may be captured via for example one or more (e.g., a network of) solar power cells mounted on the vehicle that may provide direct power or power via an intermediate battery to heat after-treatment systems (e.g., by directing electricity to such systems). The solar power energy may be managed independently (or dependently) of other vehicle energy systems (e.g., the main vehicle battery) and may provide power or energy, for example, even when the vehicle engine is off. Since the solar power energy source does not depend on the main battery, the after-treatment system may begin to be heated prior to starting the engine, for example, to be fully (or partially) pre-heated to optimal temperatures by the time the engine is started. In one embodiment, the after-treatment system may be pre-heated or started a time prior to starting the engine which is less than, equal to, or greater than the time typically used to achieve the system's optimal functional temperature. In some embodiments, solar power sources may have a longer time delay to pre-heat the after-treatment system (e.g., twenty minutes) than conventional vehicle energy sources (e.g., two to four minutes) and may be started earlier to account for the extra length of the time delay.

Fluctuations in available energy from the solar power energy source may further affect the time used to heat the after-treatment system by solar power. For example, on a sunny day, solar power energy sources may provide more energy and may take less time to power the after-treatment system than during a cloudy day or during nighttime. In some embodiments, to account for such solar fluctuations, the solar energy sources may have an energy reserve or battery (e.g., separate from the main vehicle battery). Therefore, the vehicle solar energy source may harness solar energy from the Sun during sunlight hours and may store the energy to power the after-treatment system at any time, regardless or currently available solar power (for example, during daytime as well as during nighttime).

Accordingly, a solar-powered after-treatment system in a vehicle may be pre-heated, for example, to optimal temperatures for optimal efficiency, prior to starting the vehicle engine. Accordingly, the conventional time delay during which the vehicle emits noxious exhaust in the minutes after starting the vehicle may be eliminated or at least reduced.

FIG. 1 is a schematic diagram of a vehicle 100 and an after-treatment system according to an embodiment of the present invention. Vehicle 100 (e.g. a locomotive device such as an automobile, truck, plane, boat, forklift, etc., or non-locomotive device such as a mining equipment or other engine-equipped machine) may include a main body 102 and optionally, an auxiliary power unit (APU) 104. Main body 102 may be a standard vehicle and may provide at least driving capabilities. Auxiliary power unit 104 may include an extension that may be integral to or detachable from main body 102.

Vehicle 100 may include photovoltaic (solar) power sources 106. Photovoltaic sources 106 may include one or a plurality of interconnected individual solar cells, solar laminate film, solar cured glass and/or surface coatings. Photovoltaic sources 106 may be mounted on either or both of main body 102 and auxiliary power unit 104. Photovoltaic sources 106 generating electricity may be mounted on any surface of vehicle 100 that may potentially be incident to the sun, for example, including the roof, trunk lid, front hood, bumpers, window guards, the windows themselves via photovoltaic glass laminate or cured glass, or any combination thereof. Photovoltaic sources 106 may be positioned at a fixed position or orientation or, using a device for tracking sun position, may be moved or movable, or rotated to a position or orientation to collect the maximal amount of solar power. Various arrangements may provide a total area of photovoltaic sources 106 of, for example, from approximately one square meter (e.g., mounted only on the roof) to about two to three square meters (e.g., mounted on the roof, trunk and hood). Photovoltaic sources 106 may generate, for example, 200 to 400 watts of power for vehicle 100.

Vehicle 100 may include an engine 108 providing mechanical power to move the vehicle and components such as a fork lift. Engine 108 may be any hydrocarbon or hybrid hydrocarbon/electric fueled power source, such as an internal combustion engine, a diesel engine, a gasoline engine, a hydrocarbon portion of hybrid powertrain or any combination thereof.

Vehicle 100 may include energy storage systems (ESS) or batteries 110 and/or 112 for storing energy in main body 102 and/or auxiliary power unit 104. Battery 110 may include one or more low-voltage (e.g., 12 volt) batteries and battery 112 may include one or more high-voltage (e.g., 300 volts or greater) batteries. In some embodiments, low-voltage battery 110 may be used for relatively low-power tasks, for example, operating windshield wiper motors, power seats, or power door locks, powering a starter for an internal combustion engine, and/or powering an after-treatment system 114. In some embodiments, high-voltage battery 112 may be used for either or both low or high-power tasks, where high-power tasks may include, for example, powering the traction motors (if included) of vehicle 100 and propelling vehicle 100.

Photovoltaic sources 106 may be electrically connected to charge or store energy generated thereby in either or both of low-voltage and/or high-voltage batteries 110, 112. Low-voltage battery 110 may be charged over a range of temperatures of from, for example, −20 degrees Celsius (° C.) to 50° C. The voltage used to charge low-voltage battery 110 may exceed the storage voltage of, for example, 12 volts. In one example, the charging voltage of a lead-acid battery over this temperature range may be from approximately 13.5 to 16.5 volts. To charge high voltage battery 112, a plurality of interconnected photovoltaic sources 106 may be connected to a DC-DC convertor to increase the voltage, for example, to about 300 volts. To charge both low and high-voltage batteries 110, 112, a step-down DC-DC convertor may be used to reduce voltages to additionally charge low-voltage battery 110. In yet another embodiment, photovoltaic sources 106 may be connected to form at least two separate arrays with one generating power to high-voltage battery 112 at high-voltage battery-charging voltages and a second generating power to low-voltage battery 110 at low-voltage battery-charging voltages. Any suitable configuration of photovoltaic or solar material or cells may be used, for example, in combination with a DC-DC convertor to increase charging voltage or a step-down DC-DC convertor to decrease charging voltage, to achieve any target charging voltage. In some embodiments, photovoltaic sources 106 may charge low and high-voltage batteries 110, 112 equally, or one before the other, for example, only charging low-voltage battery 110 after high-voltage battery 112 is fully charged or vice versa.

Vehicle 100 may include an after-treatment (A/T) system 114. After-treatment system 114 may reduce undesirable exhaust emissions for example including NOx and particulate emissions. After-treatment system 114 may include a TWC, particulate filters, lean NOx traps, hydrocarbon traps, oxidation catalysts, and catalytic converters, such as a selective catalytic reduction catalyst (SCR catalyst) or a urea-selective catalytic reduction catalyst. After-treatment system 114 may be located downstream of engine 108 and upstream of an exhaust system 116, such that emissions from engine 108 pass through after-treatment system 114 to purity exhaust before being expelled into the environment via exhaust system 116. Exhaust system 116 may be disposed on either or both of main body 102 and auxiliary power unit 104.

Figure 2:
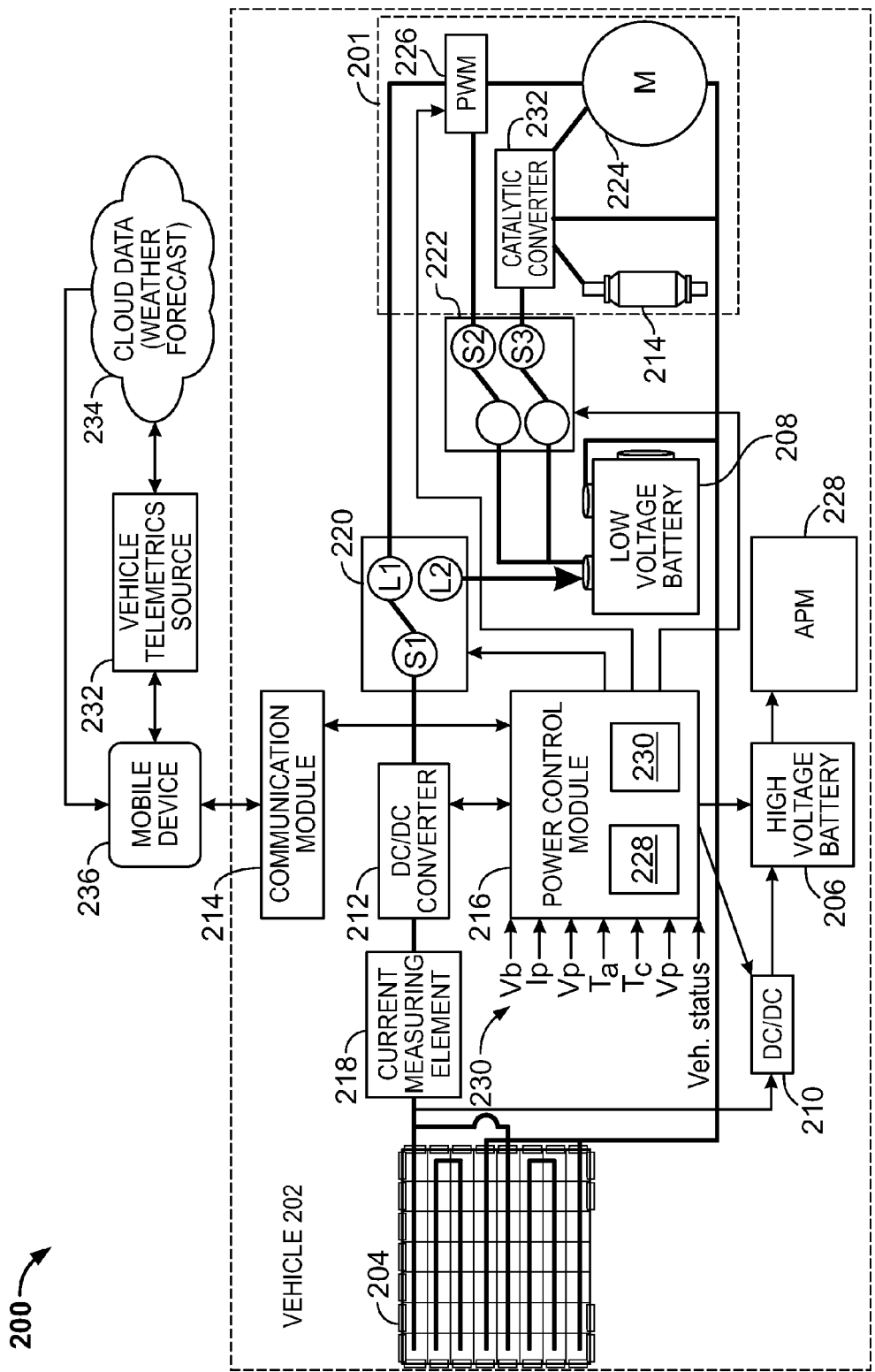
FIG. 2 is a schematic diagram of a solar-powered after-treatment system according to an embodiment of the present invention.

FIG. 2 is a schematic diagram of a solar-powered after-treatment system 200 according to an embodiment of the present invention.

System 200 may include a vehicle 202 (e.g., vehicle 100 of FIG. 1) having an after-treatment system 201 (e.g., after-treatment system 114 of FIG. 1). Vehicle 202 may include photovoltaic (solar) electric power sources 204 (e.g., photovoltaic sources 106 of FIG. 1), such as, an array of solar energy cells and/or laminate. Vehicle 202 may include one or more high-voltage batteries 206 (e.g., high-voltage battery 112 of FIG. 1), one or more low-voltage batteries 208 (e.g., low-voltage battery 110 of FIG. 1) and/or one or more auxiliary power modules (APM) 228 (e.g., auxiliary power unit 104 of FIG. 1).

A power control module 216 may control the allocation of energy (e.g. in the form of electricity) from photovoltaic sources 204 to each of vehicle 202 components (e.g., catalytic converter 214 and/or blower motor 224). Power control module 216 may use a current measuring element 216 to measure the electric power output of photovoltaic sources 204 to determine the power adjustment necessary to charge or power each of vehicle 202 components. Power control module 216 may use DC-DC converters 210, 212 to adjust (e.g., increase or decrease) the voltage output of photovoltaic sources 204.

Power control module 216 may transfer energy (e.g. in the form of electricity) from photovoltaic sources 204 to high-voltage battery 206 (e.g., and/or APM 228) at the correct high-voltage battery charging voltage, for example, via DC-DC converter 210 and to low-voltage battery 208 at the low-voltage battery charging voltage, for example, via DC-DC converter 212. Energy may be transferred to batteries 206, 208 and/or APM 228 independently or, alternatively, first to high-voltage battery 206 and/or APM 228 and, upon saturating the storage capacity or reaching an above threshold amount of stored energy, subsequently transferred to low-voltage battery 208 (or vice versa). Current measuring element 218 may be used to measure current or electricity output from the photovoltaic sources 204 to determine the available electricity from solar power for distribution. Power control module 216 may also transfer electric energy (e.g. in the form of electricity) from photovoltaic sources 204 (e.g., either directly or via an intermediate storage component, such as, low-voltage battery 208) to after-treatment system 201 components including a catalytic converter 214 and/or a blower motor 224. Power control module 216 may adjust voltage output to each of the after-treatment components according to the component's specific system standards (e.g., and according to different modes in FIG. 3), for example, via DC-DC converter 212 and may be split between after-treatment components, for example, via pulse-width modulation (PWM) device 226.

Power control module 216 may include a processor 228 and memory 230 to divert energy (e.g. in the form of electricity) to vehicle 202 components via one or more switches 220, 222. In one example, switch 220 may distribute energy to low-voltage battery 208 (e.g., in actuated position (L2)) or to blower motor 224 (e.g., in actuated position (L1)) and switch 222 may distribute energy from low-voltage battery 208 to blower motor 224 (e.g., in actuated position (S2)) or to catalytic converter 214 (e.g., in actuated position (S3)) or a heater 232 thereof. Blower motor 224 may be used to circulate heat to the catalytic converter 214. Other switches or arrangements of switches may be used to transfer energy between any components in vehicle 202.

After-treatment system 201 may include a catalytic converter, a diesel oxidation catalyst (DOC), a lean NOx trap, and/or a particulate filter. To achieve optimal after-treatment reactions, heat may be generated and circulated to catalytic converter 214 via blower motor 224 until catalytic converter 214 is heated to temperatures within an optimal temperature range (e.g., defined according to the after-treatment process and specifications of the catalytic converter).

Power control module 216 may input information 230 to determine (e.g., at processor 228) the appropriate amount of energy to transfer to after-treatment system 201 to heat catalytic converter 214 within the optimal temperature range. Information 230 may include data on conditions that affect the optimal amount of energy or power to allocate to catalytic converter 214, heater 232 and/or blower motor 224 to achieve the optimal temperature. Information 230 may include, for example, voltage of one or more energy sources (Vb) (e.g., low-voltage battery 208), output current of photovoltaic source 204 (Ip), voltage of photovoltaic source 204 (Vp), ambient temperature (Ta), cabin temperature (Tc), minimum power to operate power control module 216 (5 Volts), and/or vehicle mode (e.g., parked mode, driving mode) (Veh. status). Information 230 may include additional or different conditions.

Vehicle 202 may include internal devices, such as, an internal computer, processor 228 and memory 230, temperature, voltage and/or current sensors, and/or switches 220, 222 activated by predefined environmental conditions, for example, to store, retrieve or generate information 230, such as, Vb, Ip, Vp, Tc, and min power. Vehicle 202 may also include a communication module 220 to communicate with external devices to retrieve or generate information 230, such as, Ta and Veh. status. External devices may include a vehicle telemetrics source 232 such as, a global positioning system (GPS), a weather service source 234 providing information related to weather, terrain, altitude, or other environmental information, and a mobile computing device 236, such as, a mobile computer, a smart phone, a tablet computer, a personal digital assistant (PDA), etc., which may have a wireless network connection to retrieve temperature, weather, geographic or environmental condition information from external devices or servers. Alternatively, any or all of the information 230 may be obtained by devices internal to vehicle 202 or external to vehicle 202.

Power control module 216 may use information 230 to select one or more modes defining where the energy from photovoltaic sources 204 is transferred. In one example, power control module 216 may transfer energy according to modes, for example, as defined in FIG. 3. Power control module 216 may provide energy by providing a current at a voltage (to result in a certain power level), which may be predetermined according to the voltage of the energy source (e.g., high-voltage battery 206, APM 228 or low-voltage battery 208).

FIG. 3 is a chart defining relationships between a plurality of different energy modes 304 for allocating energy to different components in a vehicle (e.g., vehicle 100 of FIG. 1) and a plurality of conditions 300 according to an embodiment of the present invention. When a set of conditions 300 are detected, a control module may select a corresponding mode 304 for operation. Conditions 300 may include, for example, vehicle driving status or modes (e.g., if the vehicle is in park (0) or drive (1)), solar power (e.g., if there is light from the sun (1) or moon (0)), if a measured temperature is greater than, less than, or equal to a reference temperature (Tref), and available battery voltage (e.g., if the voltage of one or more energy sources (Vb) such as low-voltage battery 208 of FIG. 2 is within a maximum, mid, or minimum voltage range). The measured temperature may be for example a cabin temperature (Tc), current temperature of the after-treatment system, current exhaust gas temperature when the vehicle is operating, etc. The reference temperature (Tref) may be the optimal temperature (or temperature range) for an after-treatment system. The reference temperature (Tref) may also be equal to the difference between the ambient temperature (Ta) and the cabin temperature (Tc) (Tref=Ta−Tc)).

Each one of the plurality of energy modes 304 may correspond to a set of switch positions 302 and energy allocations 306. Energy allocations 306 may define the amount or percentage of energy (e.g., electricity) generated at a solar energy source to be allocated to different components of the vehicle. The energy may be distributed directly from the solar energy source (e.g., photovoltaic sources 106 of FIG. 1) or via an intermediate energy storage system (e.g., low-voltage battery 110 of FIG. 1). The components in the example in FIG. 3 are blower motor (X) (e.g., blower motor 224 of FIG. 2), battery (Y) (e.g., low-voltage battery 208 of FIG. 2) and one or more after-treatment components (e.g., catalytic converter 214 of FIG. 2), although other components may be used. Energy modes 304 in the example in FIG. 3 include "Sleep 1" (e.g., 0% energy allocated to components during drive mode), "Sleep 2" (e.g., 0% energy allocated to components during park mode), "Blower ON 1" (e.g., 100% energy allocated to the blower), "Blower ON 2" (e.g., 80% energy allocated to the blower and 20% energy allocated to the battery), "Blower ON 3" (e.g., 40% energy allocated to the blower and 60% energy allocated to the battery), "Trickle Charge" (e.g., 60% energy allocated to the battery), "Bulk Charge" (e.g., 100% energy allocated to the battery), "After-Treatment" (e.g., 100% energy allocated to the after-treatment component(s) or associated parts, such as, a heating device or coil to heat the catalytic converter), although other modes may be used. A power control module (e.g., power control module 216 of FIG. 2) may store these relationships between conditions 300 and the energy allocations 306 for energy modes 304, for example, in a memory unit (e.g., memory 230 of FIG. 2).

The power control module may use a pulse-width modulation (PWM) device (e.g., PWM device 226 of FIG. 1) to divide electric energy from the solar energy source in different proportions among each of the different components based on conditions 300, for example, according to energy allocations 306.

Figure 4:
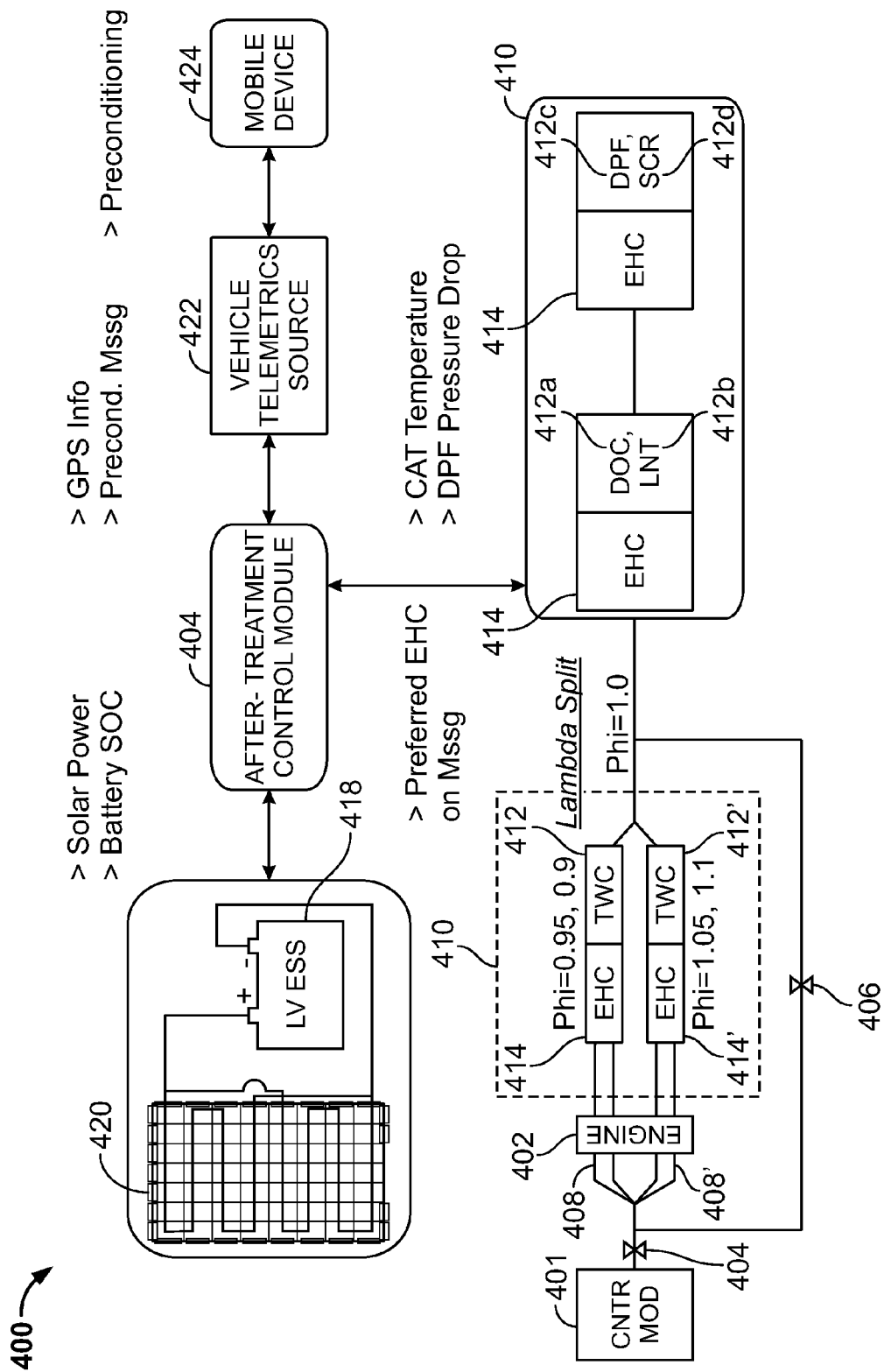
FIGS. 4-8 are schematic diagrams of systems according to embodiments of the invention.

FIG. 4 is a schematic diagram of a system 400 according to an embodiment of the present invention.

System 400 may include an engine 402 and a throttle 404. Engine 402 may be an internal combustion engine, a diesel engine, a gasoline engine, an electric engine, a hybrid engine, etc. Throttle 404 may control the supply of power to engine 402. For internal combustion engines such as diesel or gasoline engines, throttle 404 may control the fuel or gasoline supplied to engine 402, while for electric and/or hybrid engines, throttle 404 may control the electricity supplied and/or the mix of electricity and gasoline used. A control module 401 may control the flow of fuel to engine 402 by controlling the opening and closing of the one or more exhaust gas recirculation ('EGR') valves 406.

The fuel may be sent to two (or more) sets of combustion chambers 408 and 408' in which the fuel may be combusted (oxidized) to power engine 402. In some embodiments, control module 401 may cause fuel to be provided to combustion chambers 408 and 408' using for example lambda split fuel injection, in which fuel is injected into the first set of combustion chambers 408 to operate at a "rich" or relatively high air/fuel ratio (e.g., phi=0.95-0.9), and fuel is injected into the second set of combustion chambers 408' to operate at a "lean" or relatively low air/fuel ratio (e.g., phi=1.05-1.1).

Control module 401 may control the ignition of each combustion chamber 408 and 408', for example, at a time delay, to propel a piston on a crankshaft or a turbine disk in a gas turbine engine, and run engine 402. Each set of combustion chambers 408 and 408' may have respective exhaust valves 406 that are in fluid (e.g., liquid or gas) communication with different exhaust manifolds to output exhaust, for example, via an exhaust pipe. Combustion byproducts may exit combustion chambers 408 and 408' as exhaust and pass into the exhaust gas feedstream to an exhaust after-treatment system 410.

After-treatment system 410 may reduce the toxicity of exhaust expelled from combustion chambers 408 and 408'. After-treatment system 410 may include a first and second three-way catalytic converters (TWC) 412 and 412'. Each TWC 412, 412' may include an oxidation catalyst 412a such as a diesel oxidation catalyst (DOC), an exhaust treatment device 412b such as a lean NOx trap (LNT), a particulate filter 412c such as a diesel particle filter (DPF) or a gasoline particle filter and/or a reduction catalyst 412d such as a selective catalytic reduction (SCR) or a urea selective reduction catalyst. Engine 402 may be located upstream of after-treatment system 410. Within after-treatment system 410, oxidation catalyst 412a may be disposed upstream of one or more exhaust treatment devices 412b, particulate filters 412c, and reduction catalysts 412d. Exhaust from the first set of combustion chambers 408 may be purified by first TWC 412 and exhaust from the second set of combustion chambers 408' may be purified by second TWC 412'. For optimal function, first and second TWCs 412 and 412' may be heated to optimal temperature ranges, for example, by first and second heaters 414 and 414' (e.g., electrically heated converters (EHC)), respectively.

Heaters 414 and 414' may heat TWCs 412 and 412' to temperatures within a predetermined optimal or effective catalyst temperature range. The optimal temperature range may depend upon the type of engine 402 and the type of after-treatment system 410. In one example, the optimal temperature range for operating a lean NOx trap (LNT) device is from 250° C. to 500° C. At temperatures less than 250° C., in some embodiments, NO to NO2 oxidation kinetics are too slow to effectively oxidize the NO in the exhaust gas feedstream, and the NOx reduction kinetics under rich engine operation are too slow to regenerate NOx storage sites in a timely manner during ongoing engine operation. At temperatures greater than 500° C., in some embodiments, NOx molecules may become unstable under lean engine operation, making the LNT device unable to store sufficient amount of NOx molecules. Therefore maintaining the LNT device within the optimal temperature range may increase after-treatment efficiency and decrease NOx emissions. Other target temperature ranges may include 250° C.-350° C. for catalytic converters and 600° C. to about 700° C. for diesel particulate filters.

Achieving temperatures in these optimal temperature ranges may take time. For example, if heaters 414 and 414' are started at the time of the start of engine 402, heaters 414 and 414' may achieve optimal temperatures after a time delay (e.g., 150 seconds) after the start of engine 402. Accordingly, exhaust generated during the time delay (e.g., the first 150 seconds after starting engine 402) may be improperly purified to cause engine 402 to expel exhaust with relatively high toxicity.

According to embodiments of the invention, an after-treatment control module 416 may operate after-treatment system 410 fully or partially independently of control module 401 operating engine 402. After-treatment control module 416 may provide energy to heaters 414 and 414' prior to starting or running engine 402, for example, to pre-heat after-treatment system 410 (e.g., TWCs 412 and 412'). After-treatment system 410 may initiate pre-heated prior to or by the time engine 402 is started to reduce or eliminate the time delay associated with achieving full after-treatment efficiency. Accordingly, pre-heating after-treatment system 410 may lower toxic emissions during the full operational duration of the vehicle, extend the lifespan of after-treatment system 410 and minimize the fuel penalty. For example, if after-treatment system 410 were heated by engine 402, engine 402 would output work for operating the vehicle as well as heating after-treatment system 410, stressing the engine 402 and decreasing fuel efficiency.

After-treatment control module 416 may use energy from a low-voltage energy storage system (ESS) 418 (e.g., low-voltage battery 110 of FIG. 1) to provide relatively low-voltage energy to heaters 414 and 414' to achieve optimal temperatures over a relatively longer time delay (e.g., 20-30 minutes) or energy from a high-voltage battery (e.g., high-voltage battery 112 of FIG. 1) to provide relatively high-voltage energy to heaters 414 and 414' to achieve optimal temperatures over a relatively shorter time delay (e.g., 2-3 minutes).

In some embodiments, after-treatment control module 416 may use solar power energy from a solar energy source to fully or partially power heaters 414 and 414'. After-treatment control module 416 may retrieve solar energy from photovoltaic (solar energy) sources 420, for example, stored in low-voltage energy storage system 418.

After-treatment control module 416 may be in communication with a vehicle telemetrics source 422 and/or a mobile device 424, such as, a smart phone, to retrieve information to allocate power or generate a schedule or timeline for pre-heating after-treatment system 410.

In some embodiments, a user or vehicle (with one or more associated users) may have a driving schedule (e.g., expected times when the user typically drives, such as, before and after work during the user's weekday commute, before and after meeting times for clubs or sport practices on the weekends, etc.), for example, stored in vehicle telemetrics source 422 or mobile device 424. After-treatment control module 416 may use the driving schedule to activate heaters 414 and 414' to pre-heat after-treatment system 410 to optimal temperatures by the times when engine 402 is expected to be started. The user may be alerted that the after-treatment system has begun pre-heating and/or that pre-heating is complete, for example, via an alert or alarm on their mobile device 424. The user may verify (or ignore) the prompt to initiate, continue, or not cancel pre-heating after-treatment system 410 or, conversely, may reject (or ignore) the prompt to stop, cancel or not initiate pre-heating after-treatment system 410. In another embodiment, a user may have a control button, for example, a virtual button on mobile device 424, a physical button in the vehicle, or a partial turning of an ignition key to initiate pre-heating after-treatment system 410.

In some embodiments, after-treatment control module 416 may use weather information (e.g., temperature, clouds, time of sunrise/sunset, etc., provided by vehicle telemetrics source 422 or mobile device 424) to determine an amount of energy to allocate to pre-heat after-treatment system 410. In some embodiments, if the weather information indicates future temperature fluctuations, after-treatment control module 416 may compensate for such weather changes by likewise changing the energy allocated to heaters 414 and 414' to maintain after-treatment temperature within the optimal range. After-treatment control module 416 may alter the energy allocated to heaters 414 and 414' prior to the expected future weather changes, for example, by an amount of time estimated to take heaters 414 and 414' to achieve the expected temperature compensation. In some embodiments where after-treatment control module 416 uses energy from photovoltaic sources 420, after-treatment control module 416 may provide information related to the geographical location of the vehicle and may receive a sunlight schedule indicating measures of predicted future sunlight available to the vehicle over time based on the geographical location of the vehicle. After-treatment control module 416 may change the amount of energy from photovoltaic sources 420 reserved for after-treatment system 410 based on the sunlight schedule. In one example, if the sunlight schedule predicts clouds or a decrease in the future amount of available sunlight, after-treatment control module 416 may reserve an increased or maximum amount of current solar energy resources from photovoltaic sources 420 to be stored in low-voltage energy storage system 418 to compensate for the predicted future decrease in sunlight. Conversely, if the sunlight schedule predicts direct sun or an increase in the future amount of available sunlight, after-treatment control module 416 may reserve relatively less or a minimum amount of solar energy resources for after-treatment system 410 and may distribute the remaining available energy from photovoltaic sources 420 to be used for other functionality.

In some embodiments, after-treatment control module 416 may use vehicle driving modes or status (e.g., park mode, drive mode, idle mode, start/stop mode, accelerating, decelerating, etc., which for example may be provided by vehicle telemetrics source 422) to determine an amount of energy to allocate to pre-heat after-treatment system 410. The driving modes may be measured by for example sensing the engine 402 operation or monitoring the gears of the vehicle. The driving modes may be sensed or predicted (e.g., a driving mode to be expected in the future may be a predicted driving mode) using real time traffic information, for example, provided by vehicle telemetrics source 422 and/or a mobile device 424. In one example, when engine 402 is in a park, stop or idle mode, engine 402 may cool to lower temperatures and after-treatment control module 416 may allocate more energy to heaters 414 and 414' to heat after-treatment system 410 to compensate for the temperature reduction. Similarly, when engine 402 is in a driving or start/stop mode, engine 402 may heat to higher temperatures and after-treatment control module 416 may allocate less energy to heaters 414 and 414' to heat after-treatment system 410 to compensate for the temperature increase. In some embodiments, after-treatment control module 416 may be in ongoing communication with an after-treatment system 410 temperature sensor to receive temperature measurements over time and may modulate energy or power allocations to pre-heat after-treatment system 410 accordingly.

In some embodiments, after-treatment control module 416 may use a combination of factors, e.g., driving schedule, weather information (e.g., temperature and/or sunlight schedules), and driving modes, to determine a time schedule (e.g., pre-heating start times) and/or an energy schedule (e.g., variable amounts of energy allocated over time) to pre-heat after-treatment system 410 to maintain optimal temperatures. Each set of vehicle telematics or factors used to control pre-heating may provide an extra degree of freedom to control after-treatment system 410.

Other numbers, types and configurations of combustion chambers, exhaust valves, air-fuel ratios, engines, fuels, and after-treatment systems may be used.

Figure 5:
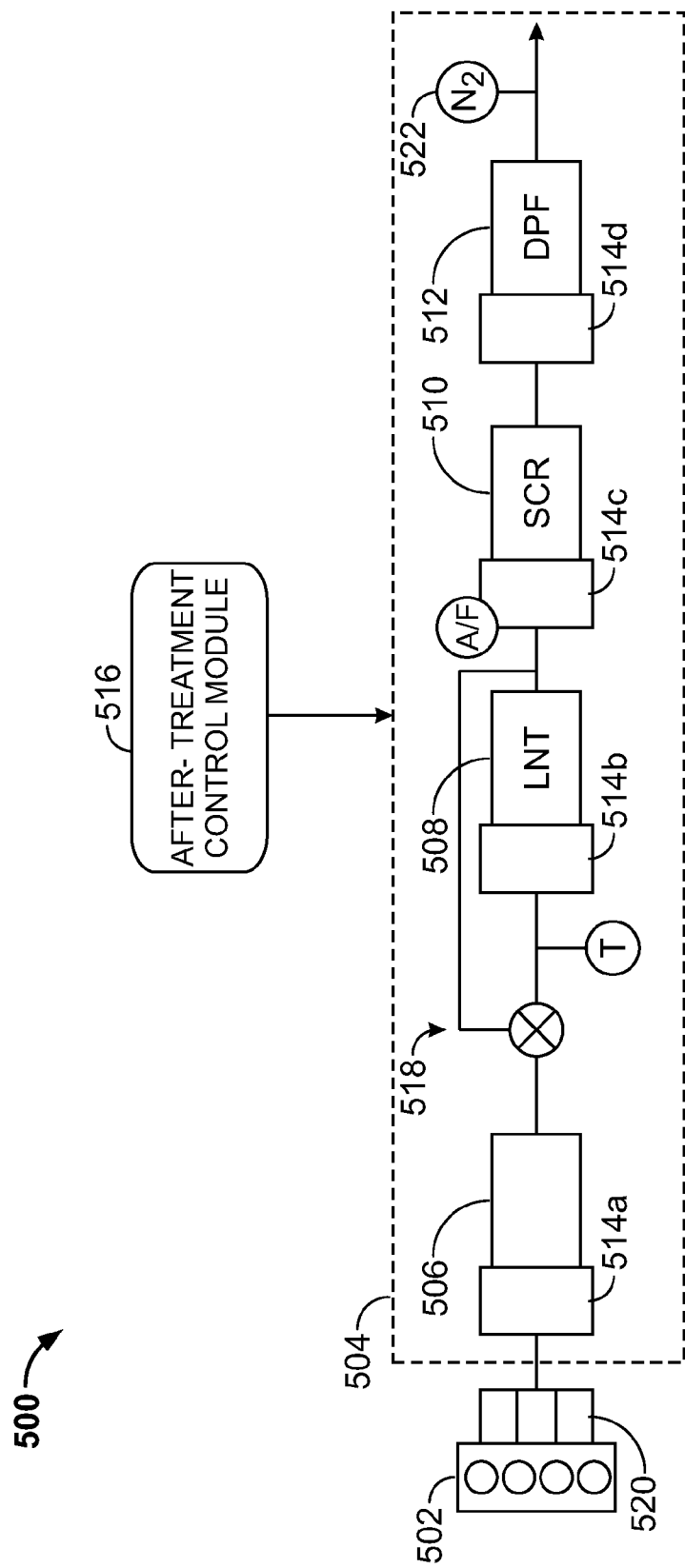

FIG. 5 is a schematic diagram of a system 500 according to an embodiment of the present invention.

System 500 may include an after-treatment system 504 in fluid (e.g., liquid or gas) communication with combustion chambers of an engine 502 to purify exhaust 520 generated by engine 502. After-treatment system 504 may purify by for example converting toxic emission in exhaust 520 such as nitrogen oxides (NOx) to less toxic or non-toxic emissions 522, such as nitrogen ($N_2$). System 500 may include a temperature sensor (T) to measure temperature of exhaust gas and an air-fuel ratio sensor (A/F) to measure the oxygen concentration of the exhaust gas.

After-treatment system 504 components may include one or more two or TWCs 506, one or more exhaust treatment devices 508, one or more reduction catalysts 510, one or more particulate filters 512. One or more diverter valves 518 may be provided to bypass or alter the exhaust flow through one or more after-treatment components 506, 508, 510 and 512, for example, to execute an after-treatment process using any combination and any order of these components.

After-treatment components 506, 508, 510 and 512 may each function at optimal efficiency within a same or different predetermined temperature range(s). An after-treatment control module 516 may provide electric energy to heaters 514a, 514b, 514c and 514d (e.g., electrically heated converters (EHC)) to heat after-treatment components 506, 508, 510 and 512 to temperatures within the predetermined temperature ranges associated with optimal efficiency for the respective components. Since one or more after-treatment components 506, 508, 510 and 512 may have different associated predetermined temperature ranges, one or more heaters 514a, 514b, 514c and 514d, may be heated independently and within different (partially or non-overlapping) temperature ranges.

After-treatment control module 516 may provide solar generated electric energy to heaters 514a, 514b, 514c and 514d, for example, generated at photovoltaic cells (e.g., photovoltaic sources 106 of FIG. 1). The solar generated electric energy provided to the after-treatment system to purify exhaust from engine 502 may be separately stored and independently controlled from the energy used to start or ignite engine 502. Solar generated energy provided to the after-treatment system may be stored in a relatively low-voltage energy storage system (e.g., low-voltage battery 110 of FIG. 1), while energy used to start engine 502 may be stored in a relatively high-voltage energy storage system (e.g., high-voltage battery 112 of FIG. 1).

Solar generated electric energy may power heater 514a to provide primary or auxiliary heat to TWC 506 for carbon monoxide (CO), UHC oxidation, ammonia ($NH_3$) generation and/or oxygen storage capacity (OSC) management, which may be monitored since TWC 506 and LNT typically have very small oxygen storage capacity. Solar generated electric energy may power heater 514b to provide primary or auxiliary heat to exhaust treatment devices 508 to maintain the temperature of a lean NOx trap (LNT), achieve faster light-off temperature (e.g., the minimum temperature threshold for after-treatment system 504 to functioning optimally, which may depend on the driving mode), to manage temperatures for the regeneration and/or sulfation of nitrogen oxides (NOx), to manage the timing of the sulfation of nitrogen oxides (NOx), and/or to manage the timing for switching between lean and rich stoichiometric operations. Solar generated electric energy may power heater 514c to provide primary or auxiliary heat to reduction catalysts 510 to manage injecting urea for ammonia ($NH_3$) formation, injecting air to make oxygen ($O_2$) available for selective catalytic reduction reactions and/or to maintain optimal temperatures at heater 514c during idle or decelerating driving modes. Solar generated electric energy may power heater 514d to provide primary or auxiliary heat to particulate filters 512 to filter particulate matter from the exhaust, manage the timing of active and/or passive regeneration, and/or monitor pressure drops.

It may be appreciated that if two or more of after-treatment components 506, 508, 510 and 512 have the same or overlapping optimal temperature ranges, the components may be heated by a single heater 514a. In other embodiments, a single heater may provide multiple temperatures, for example, at different locations, nodes or distances from the heater or at different times to heat multiple different after-treatment components 506, 508, 510 and 512 to temperatures within different optimal temperature ranges. It may also be appreciate that other after-treatment systems, components or arrangements of components may be used.

Figure 6:
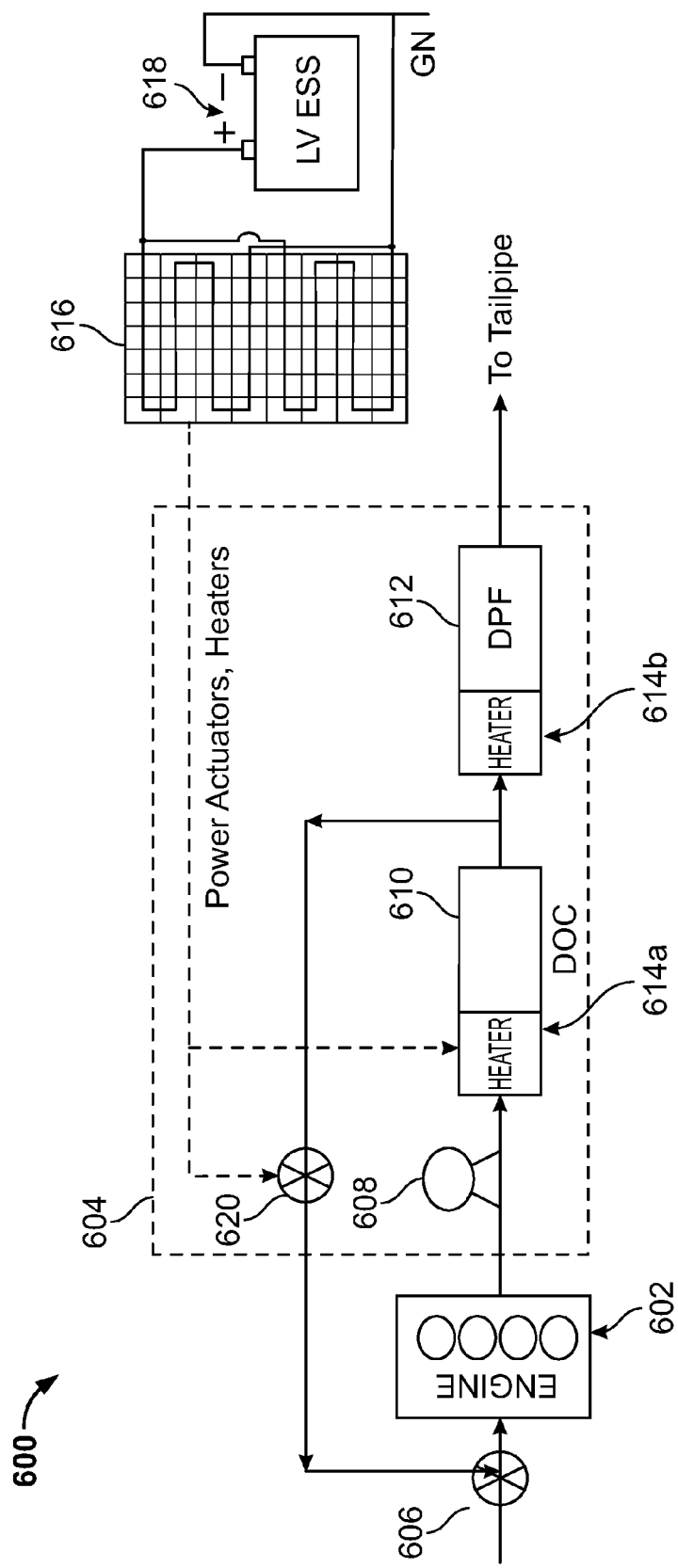

FIG. 6 is a schematic diagram of a system 600 according to an embodiment of the present invention.

System 600 may include an after-treatment system 604 for purifying exhaust generated by an engine 602. A throttle 606 may supply or control the supply of energy or fuel, to engine 602. Engine 602 may ignite the fuel in one or more combustion chambers to start engine 602 and may release toxic exhaust as a byproduct into after-treatment system 604. System 600 may include a fuel injector 608, which may be internal (in-cylinder) or external to engine 602, to inject fuel directly into the exhaust stream.

After-treatment system 604 may include an oxidation catalyst 610 such as a diesel oxidation catalyst (DOC), which may generate an exothermal reaction to oxidize the exhaust stream and injected fuel, and/or a particulate filter 612 such as a diesel particle filter (DPF) to filter particulate matter from the exhaust stream. One or more heaters 614a, 614b (e.g., heaters 414 and 414' of FIG. 4) may heat oxidation catalyst 610 and particulate filter 612, respectively, to temperatures within respective predetermined optimal functional ranges. Oxidation catalyst 610 may output an oxidized exhaust stream that, for example, depending on the actuation of a valve 620 (e.g., EGR valve 406 of FIG. 4), may be directed to particulate filter 612 or diverted to be re-cycled through engine 602.

System 600 may include a photovoltaic (solar energy) source 616 (e.g., photovoltaic sources 106 of FIG. 1) to store energy in an energy storage system (ESS) 618 (e.g., low-voltage battery 110 of FIG. 1) or to distribute the energy directly to system 600 components. Power actuators (e.g., controlled by after-treatment control module 416 of FIG. 4) may distribute the energy from photovoltaic source 616, for example, to heaters 614a, 614b, throttle 606 and/or valve 620.

Power actuators may control throttle 606 to regulate when and/or how much fuel is provided to engine 602. Power actuators may control valve 620 to re-circulate engine exhaust back to engine 602. In some embodiments, power actuators may use vehicle telematics to control the allocation of energy from photovoltaic source 616 to system components, for example, according to the driving mode.

Other after-treatment systems, components or arrangements of components may be used.

Figure 7:
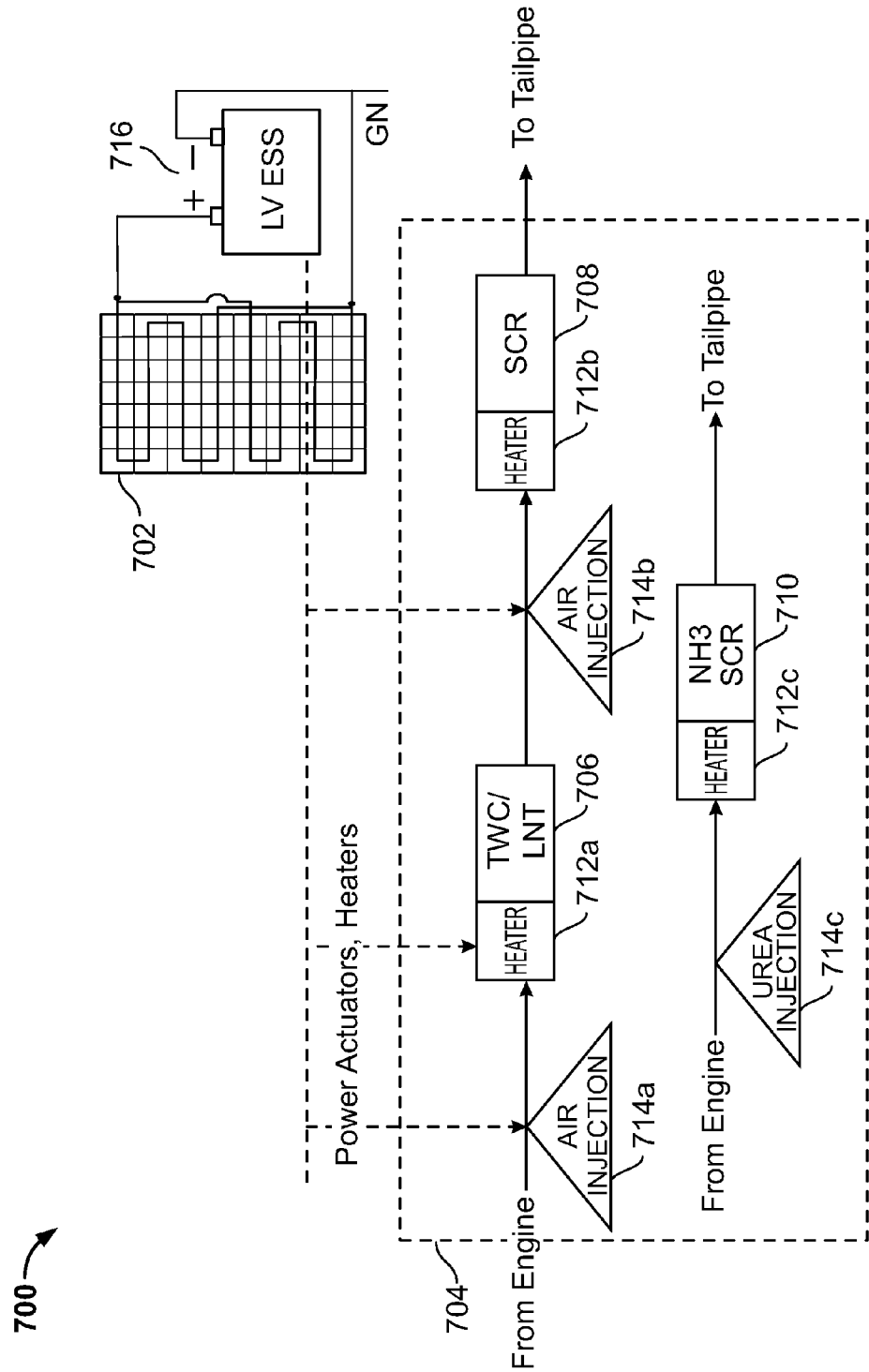

FIG. 7 is a schematic diagram of a system 700 according to an embodiment of the present invention.

System 700 may include an after-treatment system 704. After-treatment system 700 may include power actuators (e.g., controlled by after-treatment control module 416 of FIG. 4) to distribute solar electric energy, for example, directly from photovoltaic sources 702 (e.g., photovoltaic sources 106 of FIG. 1) or from an intermediate energy storage system 716 (e.g., low-voltage battery 110 of FIG. 1). Power actuators may include electro-mechanical switches, valves or other devices, for example, having open/closed activation settings or a continuous scale of activation settings, to activate one or more after-treatment system 700 components.

After-treatment system 700 components may include a catalytic converter 706 (e.g., TWC 412 and/or LNT 412b of FIG. 4), a selective reduction catalyst 708 (e.g., SCR 412d), and/or a urea or ammonia (NH$_3$) selective reduction catalyst 710. After-treatment component 706, 708, 710 may be conductively connected to heaters 712a, 712b, 712c (e.g., heaters 414, 414' of FIG. 4), respectively, to heat the components to optimal efficiency temperatures. Injectors 714a and 714b may inject air and injector 714c may inject urea into the exhaust stream input into after-treatment component 706, 708, 710, respectively.

Power actuators may control the amount of energy generated at photovoltaic sources 702 that is allocated to heaters 712a, 712b, 712c to control the temperatures and timing the temperatures thereof and/or the amount of energy allocated to injectors 714a, 714b, 714c to control the amount of air or urea injected and the timing of the injections. Power actuators may provide energy from photovoltaic sources 702 to heaters 712a, 712b, 712c to generate auxiliary heat to maintain minimum temperatures at catalytic converter 706, for example, for carbon monoxide (CO) and/or hydrocarbon (HC) oxidation, ammonia (NH$_3$) generation and/or regeneration and desulfation of nitrogen oxides (NOx). In some embodiments, power actuators may use vehicle telematics to control the allocation of energy from photovoltaic sources 702 to system components to manage, for example, the timing and/or duration of LNT regeneration, the timing and/or duration of in situ ammonia generation, the timing and/or duration of air injections by air injectors 714a, 714b, and/or the timing and/or duration of urea injections by urea injector 714c for urea decomposition, hydrolysis and NH3 formation by urea selective reduction catalyst 710.

Other after-treatment systems, components or arrangements of components may be used.

Figure 8:
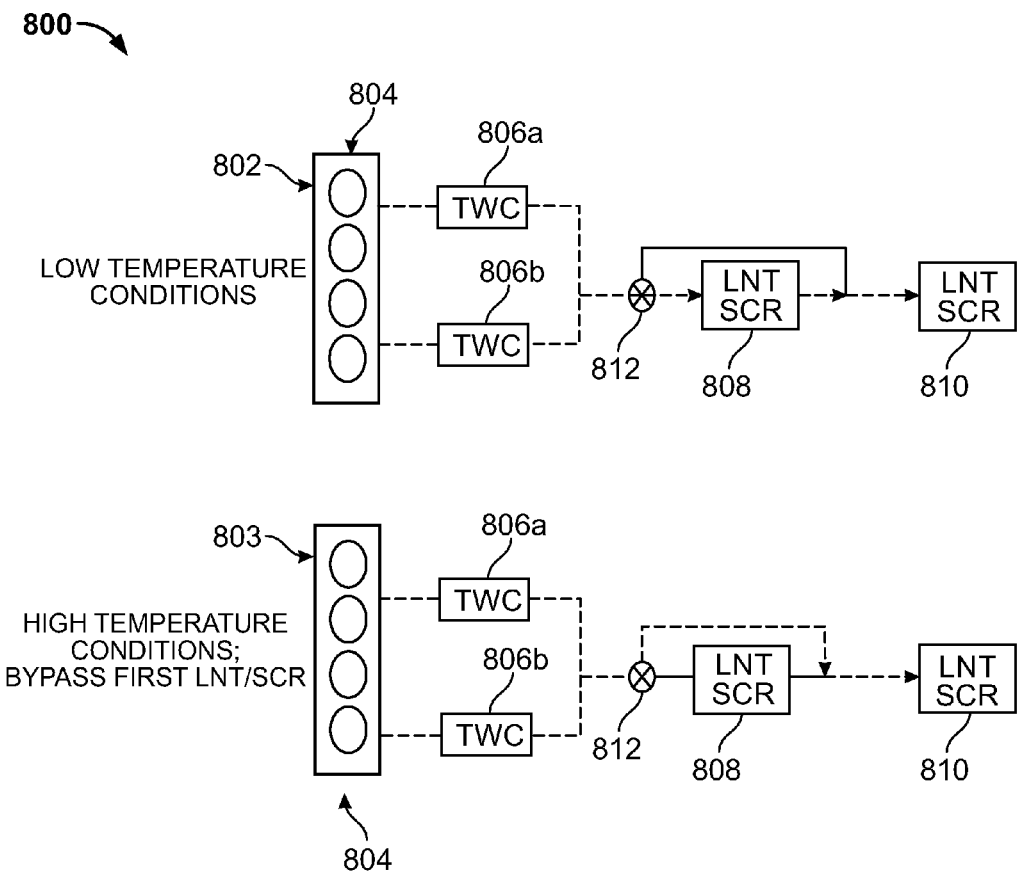

FIG. 8 is a schematic diagram of an after-treatment system 800 operating in low temperature conditions 802 and high temperature conditions 803 according to an embodiment of the present invention. Although the same components 804-812 are included in system 800 in both low and high temperature conditions 802, 803, different components may be used (and not used) in each set of conditions 802, 803, for example, by way of a diverter valve 812.

After-treatment system 800 may be in fluid communication with and downstream from an engine 802 to process and decrease the toxicity of the engine exhaust. After-treatment system 800 may include power actuators to distribute energy from a solar energy source (e.g., photovoltaic sources 106 of FIG. 1) to after-treatment system 800 components.

After-treatment system 800 may include a sequence of two or more components, for example, including one or more three-way catalysts 806a and/or 806b (e.g., TWC 412 of FIG. 4) and a series of two or more 808 and/or 810 lean NOx traps (LNTs) (e.g., exhaust treatment device 412b of FIG. 4) and/or selective reduction catalysts (e.g., SCR 412d). One or more diverter valves 812 may be used to bypass or alter the exhaust flow (e.g., indicated in FIG. 8 by doted lines) through one or more after-treatment components 806a, 806b, 808, and/or 810. In the example shown in FIG. 8, during low temperature conditions 802, diverter valve 812 may be actuated in a first position to allow exhaust to flow sequentially through components 806a/806b, 808, 810, while during high temperature conditions 803, diverter valve 812 may be actuated in a second position to divert exhaust to bypass the first LNT/SCR components 808 and flow sequentially through components 806a/806b and 810. Alternatively, other components may be used in other conditions and/or other orders. The actuation position of diverter valve 812 and the corresponding activated after-treatment components may correspond to different modes, for example, shown in FIG. 3 including different driving conditions. Diverter valve 812 may be activated by the power actuators using energy from a solar energy source. Diverter valve 812 may include additional actuation positions other than the two shown in FIG. 8. In some embodiments, power actuators may use vehicle telematics to determine when to switch diverter valves 812, for example, depending on driving modes, weather conditions, traffic reports, geographical information such as altitude or pressure changes, curving roads, or other environmental factors.

Figure 9:
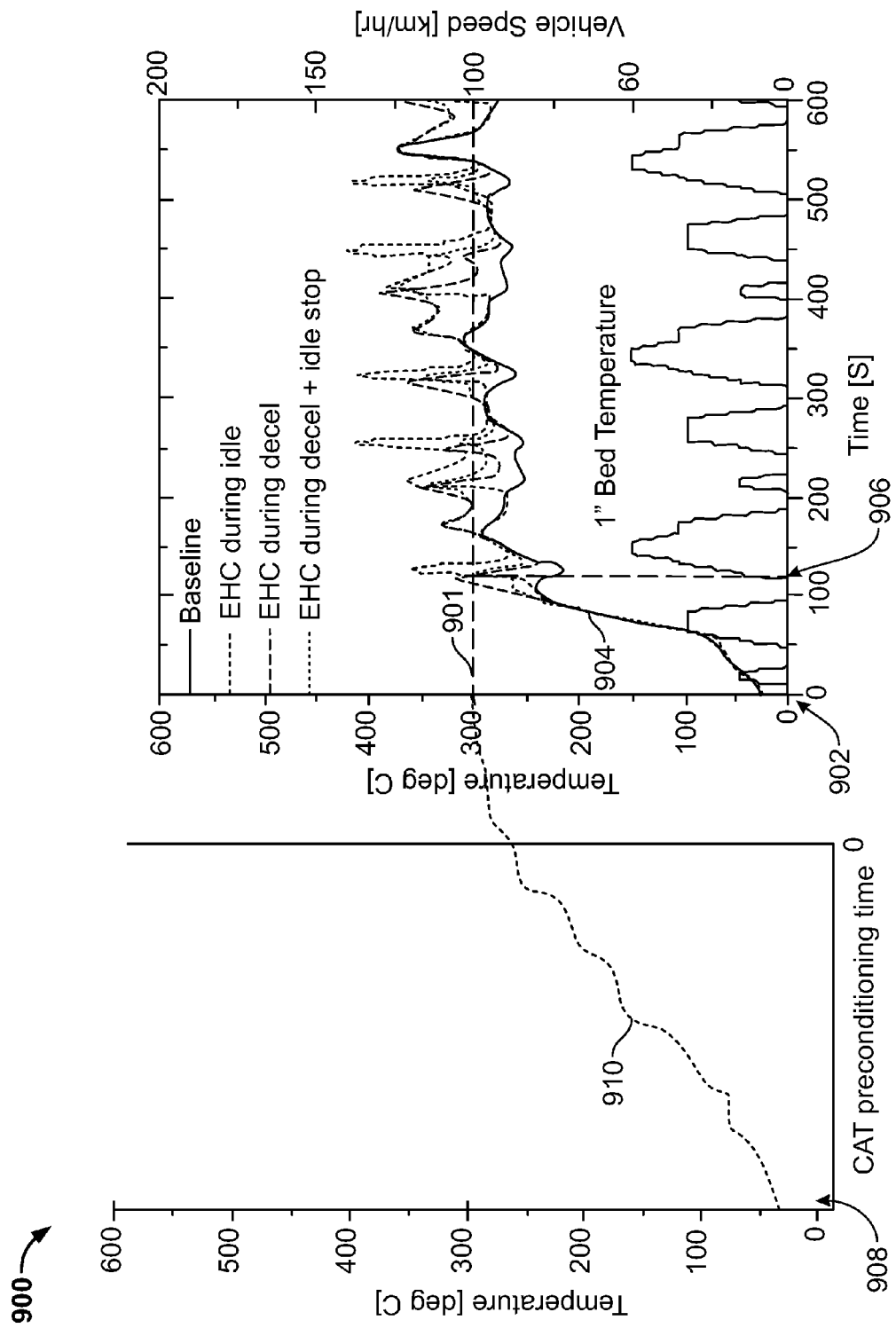
FIG. 9 is a graph of temperatures of an after-treatment system for an engine with respect to time according to an embodiment of the present invention.

FIG. 9 is a graph of temperatures of an after-treatment system with respect to time according to an embodiment of the present invention. Target temperature 901 may be an optimal temperature (or median of an optimal temperature range) for optimal after-treatment system performance. In the example of graph 900 in FIG. 9, target temperature 901 is 300° C., although other target temperatures may be used for different after-treatment processes and devices. Time 902 may be the start time of an engine purified by the after-treatment system.

Graph segment 904 starting at engine start time 902 and ending at subsequent time 906 may represent the temperatures of the after-treatment system where heating is initiated by the start of the engine at start time 902. Once the engine is started, temperatures increase at a relatively fast rate, for example, by way of heat generated by operating the engine and/or using a main high-voltage vehicle battery. However, there is a predetermined time delay after the start of the engine at start time 902 until subsequent time 906, during which the after-treatment system is operating at sub-optimal temperatures and therefore at sub-optimal efficiency. The duration of this time delay during which the after-treatment system has sub-optimal performance may be, for example, 150 seconds, and may vary depending on the type of engine, fuel, after-treatment system, and target temperature 901.

According to embodiments of the invention, after-treatment system may include heaters (e.g., heater 414 of FIG. 4) to initiate pre-heating at an after-treatment start time 908 independent of and prior to engine start time 902. After-treatment start time 908 may begin prior to engine start time 902 by a time difference, for example, less than, equal to, or greater than the time delay used to achieve the system's optimal functional temperature. Accordingly, the time delay during which the after-treatment system has sub-optimal temperatures (and therefore sub-optimal performance) may be shifted from after engine start time 902 to before engine start time 902. Shifting the start time 908 for pre-heating after-treatment system to before the engine start time 902 may reduce or eliminate extraneous toxic emissions generated at sub-optimal temperatures. In some embodiments, pre-heating may be powered by solar energy sources, which may have a relatively longer time delay to pre-heat the after-treatment system (e.g., twenty minutes) than conventional vehicle energy sources (e.g., two to four minutes) and may be started earlier to account for the extra length of the relatively longer time delay. After-treatment system may be heated to target temperature 901 before or at start time 902 or at least before subsequent time 906.

Once target temperature 901 is achieved, temperatures of the after-treatment system may fluctuate above and below target temperature 901, for example, depending on the work done by the engine due to driving conditions, such as, acceleration, deceleration, idling, etc. After-treatment heaters may be operatively linked to temperature sensors monitoring temperatures of the after-treatment components. As the temperatures of the after-treatment system components fluctuate, the energy provided to heaters may be adjusted to complement the sensed temperatures to maintain component temperatures approximating target temperature 901, for example, for as long as the engine is operational for optimal after-treatment performance.

Figure 10:
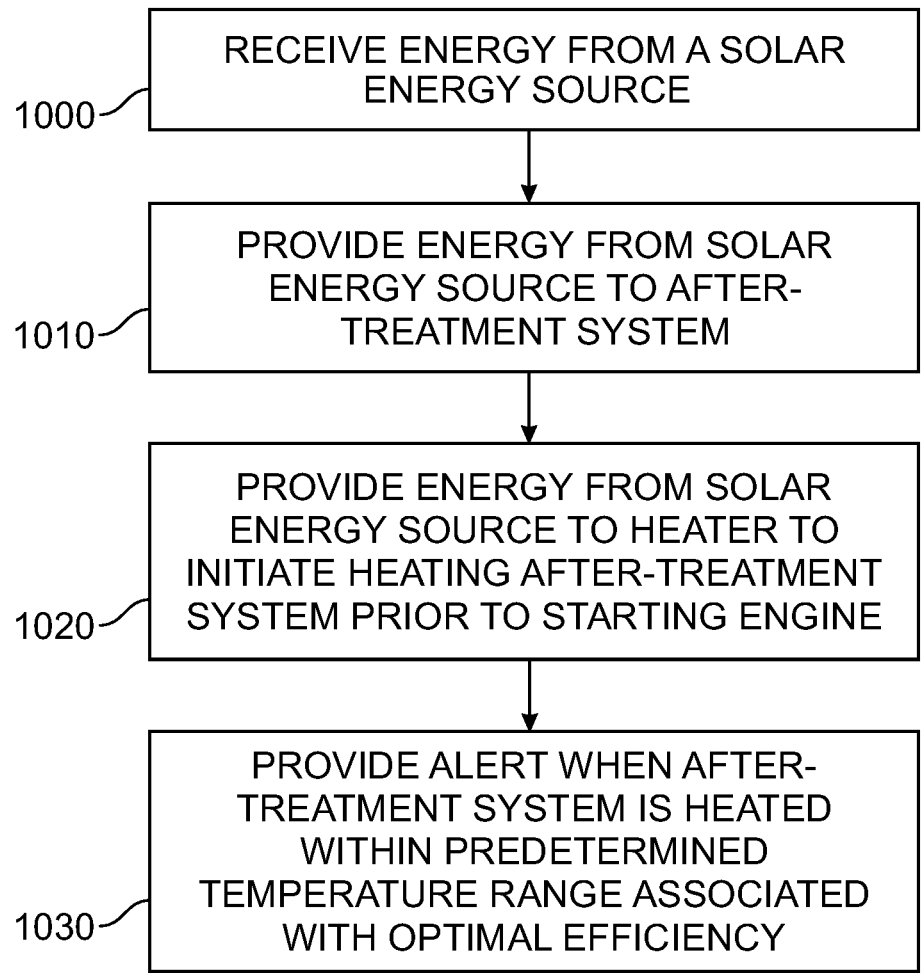
FIG. 10 is a flowchart of a method according to an embodiment of the present invention.

FIG. 10 is a flowchart of a method according to an embodiment of the present invention.

In operation 1000, energy may be received from a solar energy source (e.g., photovoltaic sources 106 of FIG. 1) electrically connected to an after-treatment system (e.g., after-treatment system 114 of FIG. 1). The solar energy source may be electrically connected to the after-treatment system directly or via intermediate components such as a controller, batteries, etc.

In operation 1010, a control module (e.g., after-treatment control module 416 of FIG. 4) may provide at least some (e.g., a portion, a fraction, or all) of the energy from the solar energy source to the after-treatment system. For example, some (e.g., some fraction) or all electricity from photovoltaic sources may be provided to the after-treatment system.

In operation 1020, the control module may provide at least some of the energy from the solar energy source to a heater (e.g., heater 414 of FIG. 4), for example, to initiate heating the after-treatment system prior to starting the engine. In some embodiments operations 1000-1020 may occur before the engine of the vehicle is turned on.

In operation 1030, the control module may provide an alert or alarm when the after-treatment system is heated to temperatures within a predetermined temperature range associated with optimal efficiency for the after-treatment system. The alarm may indicate that the engine is started with optimal or above threshold after-treatment results.

Other operations or series of operations may be used.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Features of various embodiments discussed herein may be used with other embodiments discussed herein. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A control system for solar-powered exhaust after-treatment system comprising:
 a plurality of photovoltaic cells mounted on a vehicle;
 an energy storage system having separate high voltage and low voltage storage batteries;
 a power control module, stored in a memory, configured to allocate electricity generated by the photovoltaic cells between the high voltage and the low voltage storage batteries in accordance with predicted sunlight availability received from one or more telemetric providers; and
 an after-treatment system powered from electricity from the energy storage system, the after-treatment system in communication with an after-treatment control module, stored in a memory, configured to distribute electricity from the energy storage system to the after-treatment system in accordance with a driving mode in which the vehicle is operating.

2. The system of claim 1, wherein the after-treatment control module is further configured to direct electricity from the energy storage system in accordance with predicted driving modes received from the one or more telemetric providers.

3. The system of claim 1, wherein the driving mode includes a park mode.

4. The system of claim 3, wherein the driving mode includes a state of acceleration.

5. The system of claim 1, wherein the driving mode includes a state of deceleration.

6. The system of claim 5, wherein the after-treatment system includes a heater, which further includes an electrically heated converter (EHC).

7. The system of claim 1, wherein the after-treatment control module is further configured to allocate power to the exhaust after-treatment system responsively to detection of a threshold temperature by at least one temperature sensor disposed in the exhaust after-treatment system.

8. The system of claim 5, wherein the energy storage system is configured to receive electricity from the photovoltaic cells at a voltage exceeding a storage voltage of the low voltage storage battery of 12 volts.

9. The system of claim 8, wherein the energy storage system is configured to receive electricity from the photovoltaic cells at a voltage ranging between 13.5 and 16.5volts.

10. The system of claim 1, further comprising a DC-DC converter configured to increase voltage of electricity received from the photovoltaic cells.

11. A method for allocating energy to a solar-powered exhaust after-treatment system comprising:
using a power control module, stored in a memory, to:
allocate electricity generated by photovoltaic cells between high voltage and low voltage storage batteries in accordance with predicted sunlight availability received from one or more telemetric providers, wherein the high voltage and low voltage storage batteries comprise at least part of an energy storage system; and
distribute electricity from the energy storage system to an after-treatment system in a vehicle in accordance with a driving mode in which the vehicle is operating.

12. The method of claim 11, wherein the driving mode includes a parking mode.

13. The method of claim 11, wherein the driving mode includes a state of deceleration or acceleration.

14. The method of claim 11, wherein the power control module is further configured to distribute electricity from the energy storage system in accordance with predicted driving modes received from the one or more telemetric providers.

15. The method of claim 11, wherein the power control module is further configured to allocate electricity generated by photovoltaic cells between the high voltage and the low voltage storage batteries in accordance with geographical factors received from the one or more telemetric providers.

16. The method of claim 15, wherein the geographical factors includes terrain.

17. The method of claim 15, wherein the wherein the geographical factors includes altitude.

18. The method of claim 16, wherein the energy storage system is configured to receive electricity from the photovoltaic cells at a voltage exceeding a storage voltage of the low voltage storage battery of 12 volts.

19. The method of claim 18, wherein the energy storage system is configured to receive electricity from the photovoltaic cells at a voltage ranging between 13.5 and 16.5 volts.

20. The method of claim 11, wherein the energy storage system is linked to a DC-DC converter, the DC-DC convertor configured to increase voltage of electricity received from the photovoltaic cells.

* * * * *